United States Patent [19]

Herolzer

[11] 4,288,888
[45] Sep. 15, 1981

[54] DEVICE FOR REMOVING FEATHERS FROM GAME FOWL

[76] Inventor: Ralph H. Herolzer, 752 Chateau Ave., Cincinnati, Ohio 45204

[21] Appl. No.: 102,344

[22] Filed: Dec. 11, 1979

[51] Int. Cl.³ .......................................... A22C 21/02
[52] U.S. Cl. ............................................... 17/11.1 R
[58] Field of Search ................. 17/11.1 R, 64, 67, 18, 17/47

[56] References Cited

U.S. PATENT DOCUMENTS

| | | | |
|---|---|---|---|
| 1,923,415 | 8/1933 | Bingham | 17/11.1 R |
| 2,376,120 | 5/1945 | Campbell et al. | 17/11.1 R |
| 2,496,223 | 1/1950 | Lanzisera | 17/11.1 R |
| 2,543,372 | 2/1951 | Mueller, Jr. | 17/11.1 R |
| 4,199,842 | 4/1980 | Bergeron | 17/11.1 R X |

Primary Examiner—Willie G. Abercrombie
Attorney, Agent, or Firm—Cushman, Darby & Cushman

[57] ABSTRACT

A device for removing feathers from game fowl and poultry comprising a rotor including a hub disposed with its axis extending generally horizontally and a multiplicity of resilient feather removing fingers extending generally radially outwardly from said hub in annularly and axially spaced relation with respect to one another. A feather catching housing is provided in operative relation with the rotor which includes a front wall structure providing (1) exterior cover for an upper and rearward portion of the rotor, (2) exterior access to a lower and forward portion thereof, (3) a finger passage for the lower portion of the rotor, and (4) a feather receiving opening extending downwardly from said finger passage, and vertical walls providing a feather enclosure and a multiplicity of air openings. A band at the lower end of the feather enclosure serves to operatively connect the open upper end of a feather catching bag in operative relation rearwardly and below the feather receiving opening. An electric motor serves to rotate the rotor in a direction and at a speed such that the resilient fingers in the lower and forward portion thereof move arcuately downwardly and rearwardly so as to engage the upper and rearward portion of a game fowl held in engagement therewith so that the feathers thereof engaged by the resilient fingers will be moved (1) by such engagement and (2) by the accompanying relatively high velocity flow of air established by the movement of the fingers through the finger passage through the feather receiving opening into the feather enclosure for deposit into the open end of a bag while the accompanying air flows at relatively low velocity outwardly of the enclosure through the multiplicity of air openings.

9 Claims, 3 Drawing Figures

DEVICE FOR REMOVING FEATHERS FROM GAME FOWL

This invention relates to the art of removing feathers from game fowl and poultry and more particularly to a device for removing feathers from game fowl and poultry suitable for use by individual hunters and the like.

The art of removing feathers from poultry is a highly advanced art, having been practiced on a commercial basis for many years. The present invention has more to do with the provision of a device for removing feathers from game fowl which is suitable for use by individual hunters or which is useful on a non-commercial basis. One particular chore involved in hunting duck and other game fowl is preparing the duck or other game fowl after they have been bagged. A particularly arduous task is the task of removing feathers. There are available commercial machines for accomplishing the removal of feathers from poultry, however, such machines are costly and not particularly adapted for the somewhat less frequent use to which such device would be put by a hunter. There is therefore a need for a device capable of accomplishing a feather removal function with respect to game fowl which is of sufficient simplicity and economy of manufacture as to be suitable for use by individual hunters.

It is an object of the present invention to provide a device which will fullfil the aforesaid need. In accordance with the principles of the present invention, this objective is accomplished by providing a rotor including a hub disposed with its axis extending generally horizontally and a multiplicity of resilient feather removing fingers extending generally radially outwardly from the hub in annularly and axially spaced relation with respect to one another. The rotor is mounted in operative relation with respect to a feather catching housing which includes a front wall structure providing (1) exterior cover for an upper and rearward portion of the rotor, (2) exterior access to a lower and forward portion thereof, (3) a finger passage for the lower portion of the rotor and (4) a feather receiving opening extending downwardly from the finger passage. The housing also includes walls which extend rearwardly of the front wall structure and provide a feather enclosure for the upper and rearward portion of the rotor covered by the front wall structure. Preferably, the feather enclosure has a means at its lower end for operatively receiving the open upper end of a feather catching bag in operative relation therewith at a position rearwardly and below the feather receiving opening.

In the preferred embodiment, the walls of the housing which extend rearwardly of the front wall structure and provide the enclosure are formed with a multiplicity of air openings of a size insufficient to pass feathers, but of a number sufficient to allow for the low velocity flow of air outwardly of the feather enclosure. With this arrangement, when the rotor is rotated by an electric motor or the like in an operative direction and at an operative speed such that the resilient fingers in the lower and forward portion thereof move arcuately downwardly and rearwardly, an operator is enabled to hold a game fowl in engagement with the rotor fingers such that the upper and rearward portion of the game fowl will have the feathers thereof engaged by the resilient fingers. This engagement, together with the accompanying relatively high velocity flow of air established by the movement of the fingers through the finger passage, causes the feathers to move through the feather receiving opening into the feather enclosure so as to be deposited into the bag through the open upper end thereof while the accompanying air flows at relatively low velocity outwardly of the enclosure through the multiplicity of air openings. The arrangement is such that a fairly accurate control of the removed feathers is maintained, thus minimizing the requirement to effect clean-up procedures after use. Moreover, preferably the bag used is a simple plastic bag of the type readily available in most stores for use as garbage or trash bags.

Accordingly a further object of the present invention is the provision of a device of the type described which is simple in construction, economical to manufacture and effective in operation.

These and other objects of the present invention will become more apparant during the course of the following detailed description and appended claims.

The invention may best be understood with reference to the accompanying drawings, wherein an illustrative embodiment is shown.

Referring now more particularly to the drawings, there is shown therein a device, generally indicated at 10, which embodies the principles of the present invention. The device includes in general a feather removing rotor assembly, generally indicated at 12, driven by a rotor power driving assembly, generally indicated at 14, and a feather catching housing and receptacle assembly, generally indicated at 16.

The rotor assembly 12 is formed of known components which consist basically of a cylindrical hub 18 and a multiplicity of resilient fingers 20. Components of this type are disclosed in U.S. Pat. No. 2,543,372, the disclosure of which in this regard is hereby incorporated by reference into the present specification. For present purposes it is sufficient to note that the hub 18 is formed with a multiplicity of openings extending radially therethrough which are spaced apart with respect to one another both annularly and axially. Each of the resilient fingers 20 is formed with an inner end which is adapted to seat within an associated hub opening so as to extend in generally radially outward direction with respect to the axis of the hub. The assembly 12 thus provides a multiplicity of resilient fingers which extend generally radially outwardly from the hub and are spaced apart both annularly and axially with respect to one another. In the embodiment shown, there are three axially spaced rows of annularly spaced fingers with the number of fingers in each row being four or more, e.g. five. The fingers in each row are annularly staggered with respect to the fingers of the adjacent row.

Figure 1:
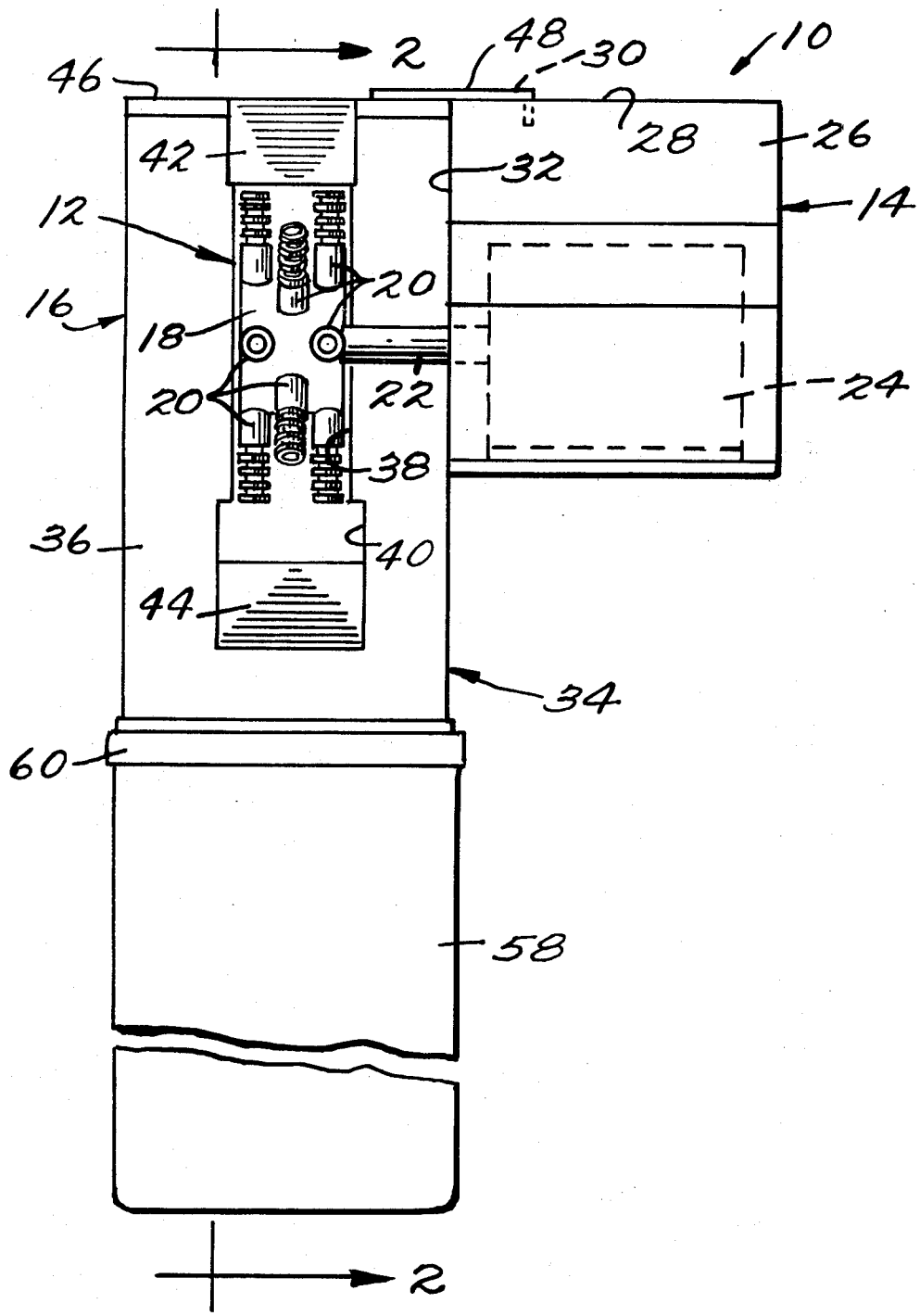
FIG. 1 is a front elevational view of a device embodying the principles of the present invention.
Figure 2:
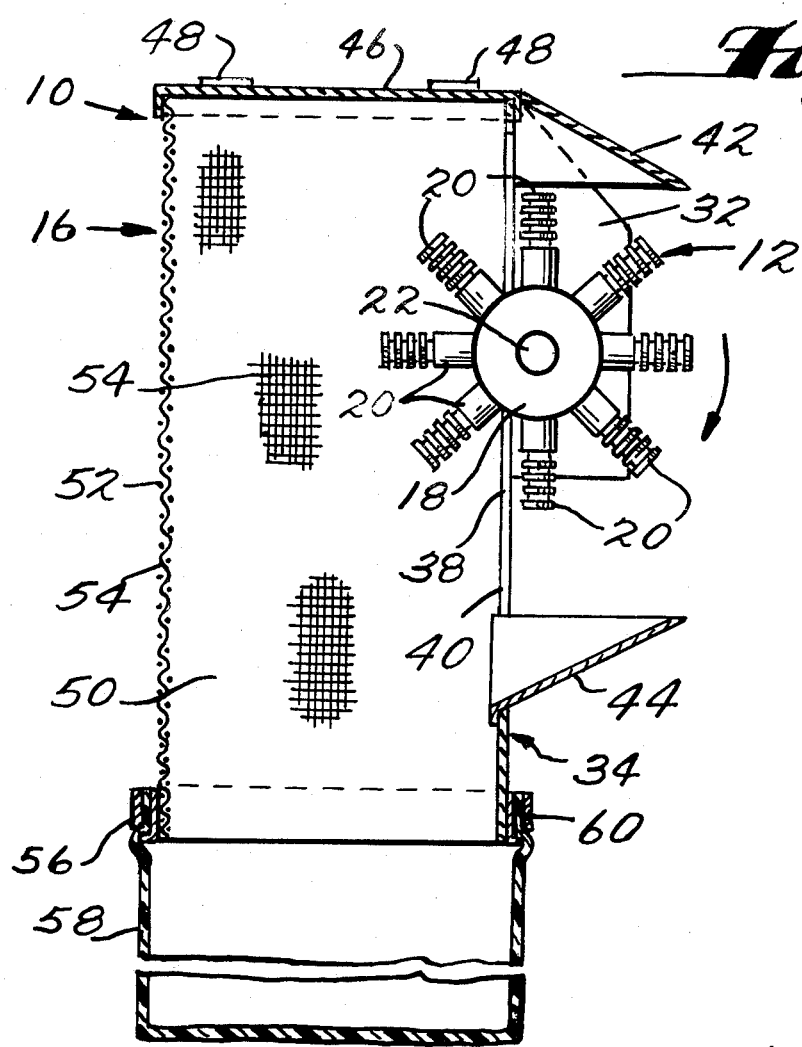
FIG. 2 is a cross-sectional view taken along the line 2—2 of FIG. 1.
Figure 3:
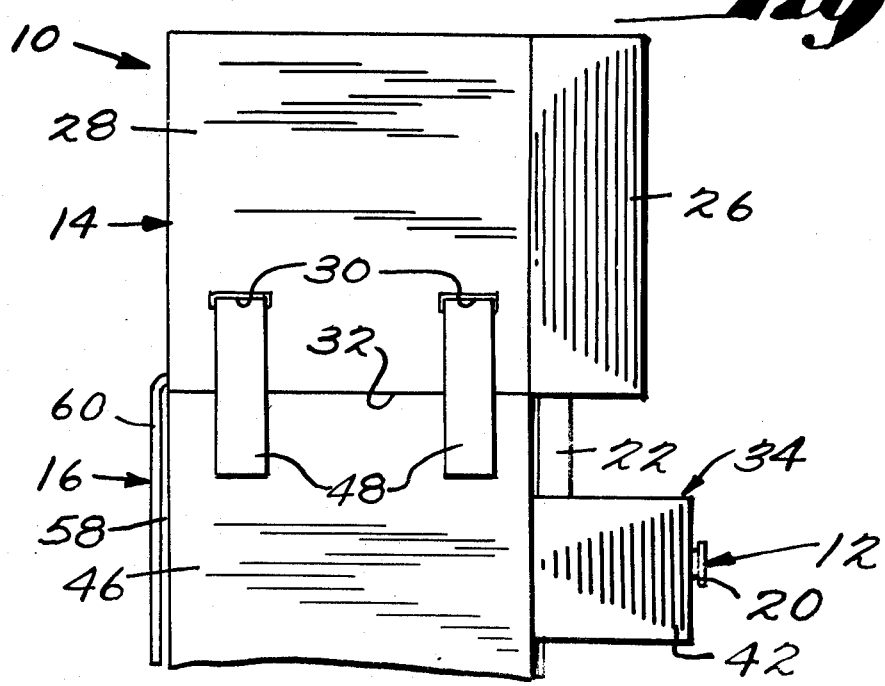
FIG. 3 is a fragmentary top plan view of the device.

As best shown in FIGS. 1 and 2, the hub 18 is fixed to the end of a horizontally extending shaft 22 so as to position the axis of the hub in a generally horizontally concentric relation therewith. The shaft 22 forms a part of the driving assembly 14 which, as shown, constitutes the output shaft of an electric motor 24. Motor 24 is of conventional construction providing an output speed of approximately 650 rpm. Preferably, the electric motor 24 of the driving assembly 14 is suitably mounted in a motor housing 26. The motor housing 26 may be of any suitable construction and is provided primarily for purposes of appearance and as a means to support the housing and receptacle assembly 16. As shown, the motor housing constitutes a simple hollow box of flat sheet metal walls which includes a bottom arranged to be fixed to a support, such as a desk or table, and an upper horizontally extending wall 28 having a pair of slots 30 therein. As best shown in FIG. 3, slots 30 are positioned in the upper wall 28 adjacent a side wall 32 which is suitably slotted to receive the shaft 22 therethrough.

The feather catching housing and receptacle assembly 16 includes a housing having a front wall structure, generally indicated at 34. The front wall structure is preferably made of sheet metal and extends generally vertically at a position rearwardly of the shaft. As shown, the front wall structure 34 includes a vertical sheet metal wall 36 which has a central portion thereof cut out to provide a passage 38 to receive the rotor therethrough, the passage including a lower portion of a size to receive the fingers 20 of the rotor 12 therethrough and an upper portion of similar configuration. The cut-out also provides a feather receiving opening 40 below the lower portion of the finger passage which has a width slightly greater than the width of the finger passage.

It will be noted that the front wall structure 34 when in its operative position is disposed so that front wall 36 is adjacent to and rearwardly of the shaft 22 with the rearward portion of the rotor extending through the passage 38 in covered relation with the front wall. The front wall structure 34 also includes a hood member 42 made of sheet metal which extends forwardly and downwardly from the wall 36 at a position just slightly above the upper portion of the passage 38. The portion of the wall 36 defining the upper portion of the passage 38 serves to provide a cover for the upper rearward portion of the rotor and the hood 42 provides a cover for the upper forward portion thereof. The front wall structure 34 provides access to the lower forward portion of the rotor and the portion of the front wall 36 which defines the lower portion of passage 38 provides a cover for the lower forward portion of the rotor.

The electric motor 24 when energized serves to drive the rotor in a clockwise direction, as viewed in FIG. 2 as indicated by the arrow, so that the fingers 20 in the lower forward portion of the rotor to which access is provided more arcuately downwardly and rearwardly. The rotor fingers 20 thus pass rearwardly through the lower portion of the finger passage 38 and forwardly through the upper portion thereof. The arrangement is such that there is a net tendency for air to be moved rearwardly through the lower part of the passage 38 and opening 40 during operation. The front wall structure also includes a guide member 44 which is preferably made of sheet metal and extends forwardly and upwardly from the vertical wall 36 from a position just below or within the lower end of the feather receiving opening 40.

The feather catching housing of the assembly 14 includes a top wall 46 preferably formed of imperforate sheet metal which extends horizontally and rearwardly from the upper edge of the front wall structure 34. Fixed to the top wall 46 and extending horizontally laterally therefrom is a pair of spaced L-shaped brackets 48. The brackets are mounted so that their legs extend downwardly from the outer ends thereof for engagement within the slots 30 formed in the upper wall 28 of the motor housing 26. The brackets therefore serve to suspend the feather catching housing and receptacle assembly 14 from the motor housing 26.

The housing of the assembly 14 also includes a pair of vertically extending side walls 50 and a vertically extending rear wall 52. Preferably, these three walls are provided by bending a metallic screen into a generally U-shaped configuration and suitably connecting the upper edges of the U-shaped screen to the three remaining peripheral edges of the top wall 46. The forward edges of the two side walls are fixed to the edges of the vertical wall 36. The side walls 50 and rear wall 52 provide a multiplicity of air openings 54 which are of a size insufficient to permit the passage of feathers therethrough. The total area provided by the air openings 54 is substantially greater than the total area of the lower portion of the finger passage 38 and the feather receiving opening 40 so as to insure that the flow of air outwardly therethrough will be at a relatively low velocity as compared with the rate of flow of the air through the finger passage when the rotor is in operation.

Formed along the lower exterior marginal edge of the front wall 36, side walls 50 and rear wall 52 is a marginal frame member 56 of generally L-shaped cross-sectional configuration which provides an exterior peripheral surface for engaging the interior of the open end of a receptacle 58. Preferably, the receptacle 58 is in the form of a plastic bag such as the plastic bags which are presently commercially available for use as garbage or trash receptacles. As shown, the bag 58 is deployed with the interior of its open end retained in engagement with the marginal frame 56 by an elongated fastening element 60 which, as shown, consists essentially of an elastic or rubber band. The element 60 could be a belt or the like, if desired. While it is greatly preferred to utilize an imperforate common plastic bag as the receptacle 58, it is within the contemplation of the present invention to utilize a foraminous bag in which case the necessary air openings for the feather enclosure are provided thereby and the vertical walls 50 and 52 can be made imperforate. However, as indicated, it is greatly preferred to provide the air openings 54 by screens defining the vertical walls 50 and 52 and to utilize the conventional throw-away imperforate plastic bags.

It will be understood that in the operation of the device 10 after energizing electric motor 24 the operator grasps the duck or other game fowl or poultry to be de-feathered and moves an upper and rearward portion thereof into the lower forward portion of the rotor. As previously indicated, when the electric motor 24 is energized, the shaft 22 thereof turns at a speed of approximately 650 rpm in a direction such that the resilient fingers 20 in the lower forward portions of the rotor 12 engaging the game fowl more arcuately downwardly and rearwardly. The engagement of the fingers with the game fowl has the effect of disengaging the feathers of the game fowl from its skin, which feathers are moved in a direction downwardly and rearwardly through the opening 40 by virtue of such engagement and by virtue of the flow of air therethrough established by the movement of the fingers 20 through the adjacent portion of the finger passage 38. The lower guide 44 serves to assist in directing the movement of the feathers through the opening and into the enclosure defined by the assembly 14. It will be noted that the direction of movement of the feathers as they enter the enclosure is generally toward the open lower end thereof through the open upper end of the receptacle or bag 58 which is held on the marginal frame 56 by the band 60. By providing in the walls 50 and 52 air openings 54 having a total area substantially greater than the opening 40 the high velocity air through that opening and the adjacent lower portion of the finger passage is diminished and the net inflow of air is allowed to escape from the enclosure through the air openings 54 at a relatively low velocity. In this way substantially all of the feathers are directed into the receptacle and there is very little tendency for feathers to be sucked onto the interior of the screen defining the openings 54 and therefore clog the same.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. A device for removing feathers from game fowl and poultry comprising a rotor including a hub disposed with its axis extending generally horizontally and a multiplicity of resilient feather removing fingers extending generally radially outwardly from said hub in annularly and axially spaced relation with respect to one another, a feather catching housing including a front wall structure providing (1) exterior cover for an upper and rearward portion of the rotor, (2) exterior access to a lower and forward portion thereof, (3) a finger passage for the lower portion of the rotor, and (4) a feather receiving opening extending downwardly from said finger passage, said housing having wall means extending rearwardly of said front wall structure providing (1) a feather enclosure for the upper and rearward portion of said rotor covered by said front wall structure which extends downwardly below said feather receiving opening and (2) a multiplicity of air openings of a size insufficient to pass feathers and of a number sufficient to allow for the low velocity flow of air outwardly of the feather enclosure, means at the lower end of said feather enclosure for operatively connecting a feather catching bag therewith with an open end in operative relation rearwardly and below said feather receiving opening, and means for rotating said rotor in a direction and at a speed such that the resilient fingers in the lower and forward portion thereof move arcuately downwardly and rearwardly so as to engage the upper and forward portion of a game fowl held in engagement therewith so that the feathers thereof engaged by the resilient fingers will be moved (1) by such engagement and (2) by the accompanying relatively high velocity flow of air established by the movement of the fingers through said finger passage through said feather receiving opening into said feather enclosure for deposit into the open end of a bag while the accompanying air flows at relatively low velocity outwardly of the enclosure through said multiplicity of air openings.

2. A device as defined in claim 1 wherein said front wall structure includes a planar vertical wall having said finger passage and said feather receiving opening extending horizontally therethrough, said finger passage including an upper portion providing a passage for the upper portion of the rotor as well.

3. A device as defined in claim 2 wherein said front wall structure further includes a hood member extending forwardly and downwardly from said vertical wall from a position just above the upper portion of said finger passage.

4. A device as defined in claim 3 wherein said front wall structure further includes a feather guide member extending forwardly and upwardly from said vertical wall at a position just below said feather receiving opening.

5. A device as defined in claim 1, 2, 3 or 4 wherein said housing wall means includes a vertically extending screen member bent into a U-shaped configuration to include generally parallel side portions extending rearwardly from said front wall structure and a rear portion.

6. A device as defined in claim 1, 2, 3 or 4 wherein said rotor rotating means comprises an electric motor having an output shaft extending horizontally therefrom on which said hub is mounted, said motor being mounted within a motor housing from which said feather catching housing is suspended.

7. A device as defined in claim 1, 2, 3 or 4 wherein said feather catching bag connecting means includes an exterior peripheral surface at the lower portion of said enclosure for receiving the interior of the open end of a flexible plastic bag and an annular member for engaging the exterior of the open end of the bag to retain the interior thereof in engagement with said peripheral surface.

8. A device as defined in claim 1, 2, 3 and 4 wherein the total area provided by said multiplicity of air openings exceeds the total area of the finger passage and finger receiving opening.

9. A device for removing feathers from game fowl and poultry comprising a rotor including a hub disposed with its axis extending generally horizontally and a multiplicity of resilient feather removing fingers extending generally radially outwardly from said hub in annularly and axially spaced relation with respect to one another, a feather catching housing and receptacle assembly including a front wall structure providing (1) exterior cover for an upper and rearward portion of the rotor, (2) exterior access to a lower and forward portion thereof, (3) a finger passage for the lower portion of the rotor, and (4) a feather receiving opening extending downwardly from said finger passage, said assembly having means extending rearwardly of said front wall structure providing (1) a feather enclosure for the upper and rearward portion of said rotor covered by said front wall structure which extends downwardly below said feather receiving opening, (2) a feather catching receptacle with an open end disposed at the lower portion of said enclosure rearwardly and below said feathered receiving opening, and (3) a multiplicity of air openings of a size insufficient to pass feathers and of a number sufficient to allow for the low velocity flow of air outwardly of the feather enclosure, and means for rotating said rotor in a direction and a speed such that the resilient fingers in the lower and forward portion thereof move arcuately downwardly and rearwardly so as to engage the upper and forward portion of a game fowl held in engagement therewith so that the feathers thereof engaged by the resilient fingers will be moved (1) by such engagement and (2) by the accompanying relatively high velocity flow of air established by the movement of the fingers through said finger passage through said feather receiving opening into said feather enclosure for deposit into the open end of a receptacle while the accompanying air flows at relatively low velocity outwardly of the enclosure through said multiplicity of air openings.

* * * * *